Nov. 4, 1969 G. K. NEWELL 3,476,359

ANGLE COCK

Filed March 28, 1967 2 Sheets-Sheet 1

INVENTOR.
George K. Newell
BY Donald P. Rooney
Agent

Nov. 4, 1969  G. K. NEWELL  3,476,359

ANGLE COCK

Filed March 28, 1967  2 Sheets-Sheet 2

INVENTOR.
George K. Newell
BY Donald P. Rooney
Agent

United States Patent Office 3,476,359
Patented Nov. 4, 1969

3,476,359
ANGLE COCK
George K. Newell, Punta Gorda, Fla., assignor to Westinghouse Air Brake Company, Wilmerding, Pa., a corporation of Pennsylvania
Filed Mar. 28, 1967, Ser. No. 626,564
Int. Cl. F16k 31/52, 39/06
U.S. Cl. 251—260     2 Claims

ABSTRACT OF THE DISCLOSURE

An angle cock having a longitudinal throughbore closed at one end by a removable screw plug. The outlet communicates through ports adjacent the end of the throughbore opposite the screw plug, with the inlet passage to which a pipe may be connected. A cylindrical shuttle valve having O-ring seals at opposite ends is reciprocated in the throughbore by a crank pin on an operating stem, the pin extending into a transverse rectangular slot in the body of the shuttle valve. Movement of the O-ring seal at one end of the shuttle valve to opposite sides of the ports in the throughbore controls the opening and closing of communication between the inlet and outlet passages.

BACKGROUND OF THE INVENTION

According to the existing well-known construction of angle cocks and cut-out cocks, the valve member or cock key is customarily made as a tapered cylindrical valve member seated on a correspondingly tapered seat in the cock body to which it is lapped or ground and has an aperture therethrough which is aligned with or transverse to the flow passage through the cock as the valve member turns to control flow of fluid through the cock device. This type of angle or cut-out cock is reliable and has a satisfactory service life.

It is an object of the present invention to provide a new design of angle or cut-out cock having a spool type shuttle valve which utilizes a novel arrangement for mounting and actuating the valve element and which further enables rapid and easier servicing in the field by relatively unskilled workmen.

It is another object of the invention to provide an angle cock of improved, low cost and simple construction wherein the valve element is easily removable and replaceable and moves only a very short distance from full-open to full-closed position.

SUMMARY OF THE INVENTION

According to a preferred embodiment of the invention, there is provided a housing or cock body having a longitudinal throughbore threaded at one end thereof and closed by a removable screw plug. A passageway opens into the throughbore adjacent to the end opposite the closed end. A shuttle valve fitted within the throughbore has a transverse slot therein into which extends a crank pin carried on an operating stem journaled in the cock body. Rotation of the operating stem effects reciprocative movement of the shuttle valve between one position, in which it blocks communication between the open end of the throughbore and the passageway, to another position in which communication is opened between the open end of the throughbore and the passageway.

A longitudinally extending passage in the shuttle valve provides pressure equalization or balanced pressures at opposite ends of the shuttle valve. A leakage port in the cock body provides escape for fluid which leaks past the seals on the shuttle valve.

Figure 1:
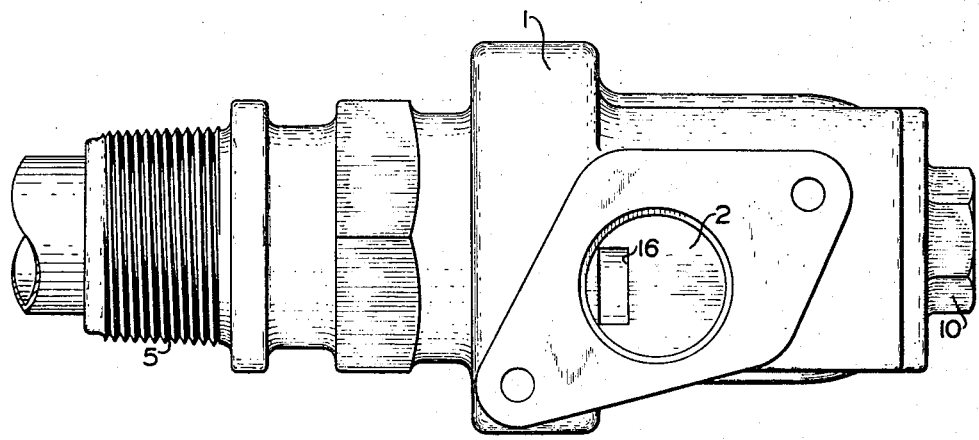
Figure 2:
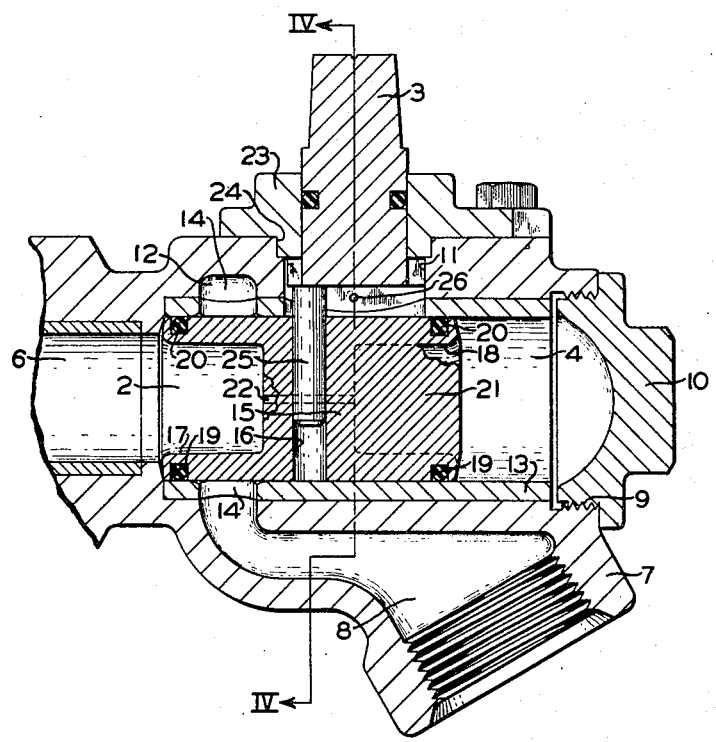
Figure 3:
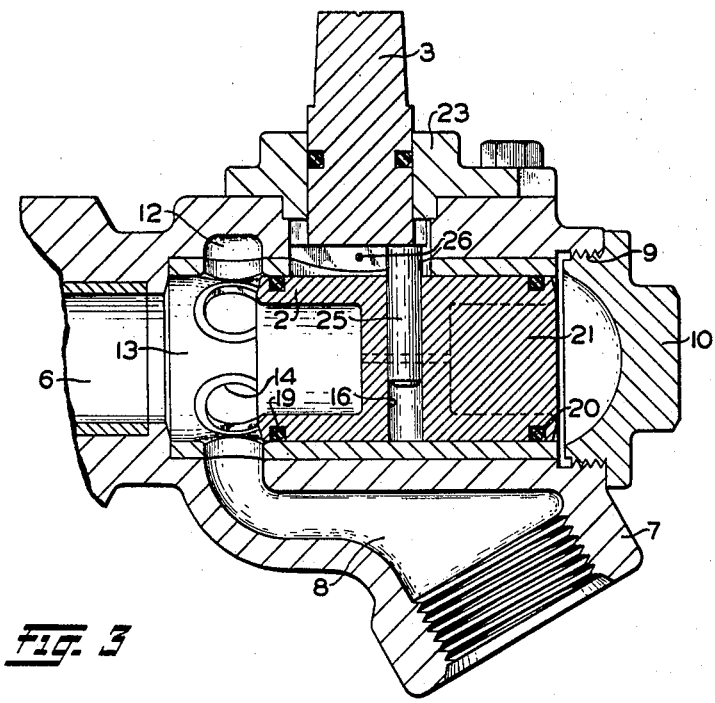
Figure 4:
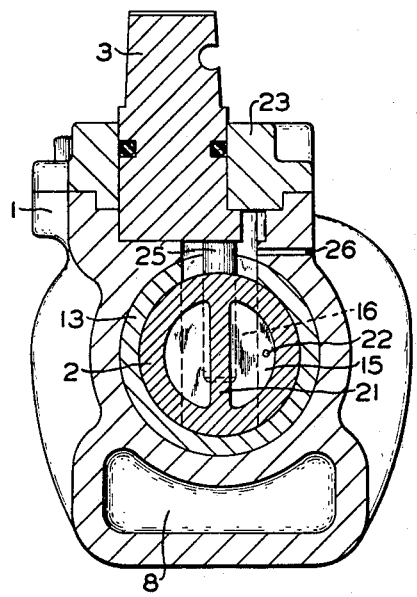

In the accompanying drawings, FIG. 1 is a top view of the angle cock, the operating handle and stem being omitted for clarity; FIG. 2 is a longitudinal sectional view of the cock shown in FIG. 1 with the valve member in a full-closed position; FIG. 3 is a view similar to that of FIG. 2 with the valve member in its full-open position; and FIG. 4 is a sectional view taken substantially along the line IV-IV of FIG. 2.

Referring now to the drawings, the angle cock comprises a housing or cock body 1, a shuttle valve 2 and a valve operating stem 3.

Housing 1 comprises a main valve chamber 4 having an externally threaded extension 5 which in turn has a main flow passage 6 therein adapted for communication with a pipe, such as the end of the brake pipe of a railroad car. The housing also comprises an internally threaded extension 7 having a flow passage 8 therein adapted for communication with a hose coupling assembly. The valve chamber 4 is open to an internally threaded end 9 which has a comparably threaded plug 10 fitted therein. The valve chamber 4 has a bore 11 transverse to the axis of the valve chamber and adapted to contain stem 3.

An annular groove 12 opening out of the said valve chamber communicates with passage 8. The said valve chamber 4 has a sleeve 13 therein which extends to and covers annular groove 12, but communication between passage 8 and the valve chamber 4 is maintained through ports 14 in the sleeve 13. Sleeve 13 can be removed from the said valve chamber 4 when threaded plug 10 is removed.

The shuttle valve 2 is adapted to reciprocate within the sleeve 13 and has a diametrical partition 15 with a through slot 16 therein, both of which are located about halfway between the ends of the shuttle valve 2. Each end of the cylindrically shaped shuttle valve has a bore 17 and 18 respectively therein. Also at each end of the shuttle valve is a circumferential groove 19 having a conventional O-ring seal 20 therein. Within bore 18 of said shuttle valve is a diametrical web 21 bisecting the said bore. The web 21 is adapted to be used as a purchase member to be grasped by pliers to facilitate withdrawal of the said shuttle valve from the said sleeve 13 after the plug 10 has been removed. A pressure equalizing port 22 is provided in the partition 15 in the shuttle valve 2 for the balancing of fluid pressure forces thereon.

Stem 3 is adapted for rotation within a conventional bonnet 23 which is fitted to the top of the said housing and in a counterbore 24 of bore 11. Fitted to the bottom of the stem 3 is a crank element 25 which extends into the transverse slot 16 of shuttle valve 2.

When it is desired that the angle cock be operated from a closed position in which it is shown in FIG. 2, to an open position, in which it is shown in FIG. 3, a conventional handle, not shown, which is attached to the outer end of the stem 3 is rotated through 90° and the crank element 25 moves in an arcuate path and slides shuttle valve thereby linearly opening communication between passage 8 and the main flow passage 6. A reverse turn of the handle through 90° causes return of shuttle valve 2 to its closed position wherein the flow of fluid between passage 8 and ports 14 and the main flow passage 6 is stopped. Any fluid under pressure that leaks past O-rings 20 is vented through port 26 eliminating any unnecessary friction between stem 3 and bonnet 23.

Although a specific embodiment of the invention has been shown and described it is with full awareness that other modifications thereof are possible within the terms of the appended claims.

Having now described the invention, what I claim as new and desire to secure by Letters Patent is:
1. An angle cock comprising:
   (a) a cock body having a longitudinal throughbore, an inlet passage aligned with one end of said bore, an outlet passage opening into said bore adjacent said one end, and a removable plug closing the end of said bore opposite said one end,
(b) a cylindrical valve member reciprocable within said bore and having a peripheral groove in the external surface thereof adjacent each end thereof within which is disposed an O-ring seal providing sealing relation between the valve member and said bore, one of said O-ring seals being movable to opposite sides of the opening of said outlet passage into said bore to open and close communication between said passages,
(c) said valve member having further a partition wall between said O-ring seals in which partition wall is a transverse slot of rectangular cross-section opening at the surface of said valve member,
(d) said cock body having therein a bore transverse to said throughbore and opening thereinto between the ends thereof, and
(e) an operating stem rotatably mounted in said transverse bore and having thereon a crank pin eccentric to the axis of rotation thereof and extending into said slot, said crank pin having a diameter conforming with a sliding fit to the width of said transverse slot in the valve member and having a throw less than the length of said slot, whereby upon rotation of said operating stem said crank pin moves transversely in said slot while shifting said valve member between positions in which communication between said passages is respectively opened and closed.

2. An angle cock as claimed in claim 1, wherein the partition wall in said valve member is provided with a passage therethrough via which fluid pressures are equalized in said passage at one end of said bore and in the chamber formed between said valve member and the closed end of said throughbore.

References Cited

UNITED STATES PATENTS

| | | | |
|---|---|---|---|
| 1,765,090 | 6/1930 | Morin | 251—282 X |
| 1,772,406 | 8/1930 | Whiton | 251—282 X |
| 2,032,302 | 2/1936 | Novotny | 251—257 |
| 2,661,762 | 12/1953 | Bryant | 137—315 X |

WILLIAM F. O'DEA, Primary Examiner

DAVID R. MATHEWS, Assistant Examiner

U.S. Cl. X.R.

137—315, 329.02; 251—282